United States Patent [19]
Leung et al.

[11] Patent Number: 6,000,007
[45] Date of Patent: *Dec. 7, 1999

[54] CACHING IN A MULTI-PROCESSOR COMPUTER SYSTEM

[75] Inventors: Wingyu Leung, Cupertino; Kit Sang Tam, Belmont, both of Calif.

[73] Assignee: Monolithic System Technology, Inc., Sunnyvale, Calif.

[ * ] Notice: This patent is subject to a terminal disclaimer.

[21] Appl. No.: 09/080,893

[22] Filed: May 18, 1998

Related U.S. Application Data

[63] Continuation of application No. 08/479,915, Jun. 7, 1995, Pat. No. 5,787,267.

[51] Int. Cl.$^6$ ............................. G06F 12/00; G11C 8/00
[52] U.S. Cl. ............... 711/105; 365/230.08; 365/230.03
[58] Field of Search .................................... 711/104, 105, 711/153; 365/189.05, 203, 230.03, 230.08

[56] References Cited

U.S. PATENT DOCUMENTS

| | | | |
|---|---|---|---|
| 4,725,945 | 2/1988 | Kronstadt | 711/106 |
| 4,870,622 | 9/1989 | Aria | 365/230.02 |
| 5,134,699 | 7/1992 | Aria | 395/855 |
| 5,301,162 | 4/1994 | Shimizu | 365/230.03 |
| 5,307,314 | 4/1994 | Lee | 365/189.04 |
| 5,327,486 | 7/1994 | Wolff et al. | 379/96 |
| 5,347,574 | 9/1994 | Morganstein | 379/210 |
| 5,386,527 | 1/1995 | Bosshart | 711/3 |
| 5,497,351 | 3/1996 | Oowaki | 365/230.03 |
| 5,499,355 | 3/1996 | Krishnamohan | 711/137 |
| 5,528,552 | 6/1996 | Kamisaki | 365/238.5 |
| 5,577,223 | 11/1996 | Tanoi | 711/118 |
| 5,586,078 | 12/1996 | Takase | 365/230.03 |
| 5,668,862 | 9/1997 | Bannister et al. | 379/201 |
| 5,787,267 | 7/1998 | Leung | 711/105 |
| 5,875,451 | 2/1999 | Joseph | 711/105 |
| 5,875,452 | 2/1999 | Katayama | 711/105 |

FOREIGN PATENT DOCUMENTS

| | | |
|---|---|---|
| WO91/16680 | 10/1991 | WIPO . |
| WO93/18459 | 9/1993 | WIPO . |
| 9726764 | 7/1997 | WIPO ............................. H04Q 7/22 |

OTHER PUBLICATIONS

Tanoi S., et al, "A 32–Bank 256–Mb DRAM with Cache and Tag", IEEE Journal of Solid–State Circuits, vol. 29, No. 11, pp. 1330–1335, Nov. 1994.

Handy J, "The Cache Memory Book", ISBN 0–12–322985–5, pp. 85–87, 1993.

Hennessy J, Patterson D., "Computer Architecture: A Quantitative Approach", ISBN 1–55860–069–8, Chapter 10.8 (pp. 582–585), 1990.

Gallant, "Cache–Coherency Protocols, Protocols Keep Data Consistent," Technology Update, EDN Mar. 14, 1991, pp. 41–50.

Pohm et al., "Memory Hierarchy Organizations," *High–Speed Memory Systems*, Reston Publishing, 1983, pp. 75–83.

Thapar et al., "Scalable Cache Coherence Analysis for Shared Memory Multiprocessors," *Scalable Shared Memory Multiprocessors*, Kluwer Academic Publishers, 1992, pp. 153–166.

Leventhal, "Leventhal's 80386 Programming Guide", ISBN 0–553–34529–X, 1987, pp. 6–9.

*Primary Examiner*—John W. Cabeca
*Assistant Examiner*—Christopher S. Chow
*Attorney, Agent, or Firm*—Skjerven, Morrill, MacPherson, Franklin & Friel, LLP

[57] ABSTRACT

A structure and method of implementing a cache memory for a multi-processor system. The cache memory includes a main memory which is coupled to a main memory bus. A plurality of processors can also be coupled to the main memory bus. The main memory includes a plurality of RAM circuit module memory banks. The sense amplifiers of a predetermined number of banks are used as cache memory (i.e., sense amplifier cache lines). The number of banks used with sense amplifiers activated is substantially less than the total number of banks. The banks which are not used as cache memory are kept in a precharged state.

8 Claims, 12 Drawing Sheets

| 500 | | | |
|---|---|---|---|
| Entry 1 | Bank | Row | Status |
| Entry 2 | Bank | Row | Status |
| Entry 3 | Bank | Row | Status |
| . | | . | |
| . | | . | |
| . | | . | |
| Entry T | Bank | Row | Status |

| Entry 1 | Bank | Row | Status |
|---------|------|-----|--------|
| Entry 2 | Bank | Row | Status |
| Entry 3 | Bank | Row | Status |
| ⋮ | | ⋮ | |
| Entry T | Bank | Row | Status |

500

Address Mapping of a preferred embodiment (1) End of cache-hit access, & if no server waiting on the bank
(2) Bank conflict or start of cache-hit access
(3) Entry to be replaced
(4) BANK precharged or BANK conflict

CACHING IN A MULTI-PROCESSOR COMPUTER SYSTEM

RELATED APPLICATIONS

This application is a continuation application of U.S. Ser. No. 08/479,915, filed Jun. 7, 1995, now U.S. Pat No. 5,787,267. The present application is related to commonly owned U.S. patent application Ser. No. 08/270,856, entitled "Directional Asymmetric Signal Swing Bus System for Circuit Module Architecture", by Wingyu Leung, Winston Lee, and Fu-Chieh Hsu, filed Jul. 5, 1994, now U.S. Pat. No. 5,655,113, issued Aug. 5, 1997, which is hereby incorporated by reference in its entirety.

FIELD OF THE INVENTION

The present invention relates to a data processing system having multiple processors or processes sharing a memory system with circuit module architecture. In particular, this invention relates to a memory caching/control subsystem for managing a memory system with circuit module architecture.

BACKGROUND OF THE INVENTION

FIG. 1 is a block diagram of a multi-processing system 100 which employs a shared memory architecture. System 100 includes processors 101a–101c, dedicated cache memories 102a–102c, dedicated cache controllers 103a–103c, memory bus 104, global main memory 105 and memory controller 106. Processors 101a–101c share main memory 105 through common parallel memory bus 104. Cache memories 102a–102c are typically constructed using relatively high speed SRAM arrays. Main memory 105 is typically constructed using relatively low speed and low cost DRAM arrays. Systems such as system 100 are described in the following references: (1) "Protocols Keep Data Consistent", John Gallant, EDN Mar. 14, 1991, pp.41–50 and (2) "High-Speed Memory Systems", A. V. Pohm and O. P. Agrawal, Reston Publishing, 1983, pp.79–83. Dedicated cache memories 102a–102c reduce the frequency with which each of processors 101a–101c access main memory 105. This reduces the amount of traffic on memory bus 104 and thereby enhances the performance of system 100. However, cache memories 102a–102c are relatively expensive. In system 100, an expensive cache memory must be added for each added processor. In addition, system 100 requires control logic to maintain the consistency of data in cache memories 102a–102c and main memory 105 (i.e., cache coherence). The problem of cache coherence is described in more detail in "Scalable Shared Memory Multiprocessors", M. Dubois and S. S. Thakkar, Kluwer Academic Publishers, 1992, pp.153–166. The control logic required to provide cache coherence increases the cost and decreases the performance of system 100.

FIG. 2 is a block diagram of another conventional multi-processor system 200 which includes a global main memory 204 which is divided into modules 206a–206c. Each of main memory modules 206a–206c is attached to a corresponding cache memory module 205a–205c, respectively. Each of cache memory modules 205a–205c is attached to a main memory bus 202. Processors 201a–201c are also attached to main bus 202. Processors 201a–201c share cache memory modules 205a–205c and main memory modules 206a–206c. System 200 is described in, "High-Speed Memory Systems", Pohm et al., pp.75–79.

In system 200, the number of cache and main memory modules can be different from the number of processors. Since both main memory modules 206s–206c and cache memory modules 205a–205c are global, system 200 is inherently coherent. However, the globalization of cache memory modules 205a–205c requires that the control logic for cache memory modules 205a–205c be common to all of processors 201a–201c. Consequently, in systems where the number of processors approximately equals to the number of cache entries in the cache module, cache thrashing can occur. Cache thrashing refers to the constant replacement of cache lines. Cache thrashing substantially degrades system performance.

To minimize the cost of SRAM cache memories, some prior art systems use additional prefetch buffers for instructions and data. These prefetch buffers increase the cache-hit rate without requiring large cache memories. Such prefetch buffers are described in PCT Patent Application PCT/US93/01814 (WO 93/18459), entitled "Prefetching Into a Cache to Minimize Main Memory Access Time and Cache Size in a Computer System" by Karnamadakala Krishnamohan et al. The prefetch buffers are used in a traditional separate cache memory configuration, and memory bandwidth is consumed by both the prefetch operations and the caching operations. A robust prefetch algorithm (with a consistently high probability of prefetching the correct information) and an adequate cache size and organization (to provide a high cache hit rate) is required to deliver any performance improvement over traditional caching schemes.

Other conventional systems use the sense-amplifiers of a DRAM array as a cache memory. (See, e.g., PCT Patent Publication PCT/US91/02590, by M. Farmwald et al.) Using the sense-amplifiers of a DRAM array as cache memory has the advantages of low cost and high transfer bandwidth between the main memory and the cache memory. The cache hit access time, equal to the time required to perform a CAS (column access) operation, is relatively short. However, the cache miss access time of such a system is substantially longer than the normal memory access time of the DRAM array (without using the sense amplifiers as a cache memory) This is because when the sense amplifiers are used as cache memory, the DRAM array is kept in the page mode (or activated mode) even when the DA array is not being accessed. A cache miss therefore requires that the DRAM array perform a precharge operation followed by RAS (row access) and CAS (column access) operations. The time required to perform the precharge operation (i.e., the precharge time) is approximately twice as long as the time required to perform the W operation. The total memory access time is equal to the sum of the precharge time, the RAS access time and the CAS access time of the DRAM array. In contrast, during normal operation of the DRAM array, the DRAM array is in precharged mode when it is not being accessed, and the memory access time in equal to the RAS access time plus the CAS access time of the DRAM array.

Mathematically, the average access time (Tav) in a simplified model of the sense amplifier cache system is the weighted average of cache-hit access time (Tcas) and the cache-miss access time (Tpre+Tras+Tcas). Thus, for cached accesses, $$\text{Tav} = H*\text{Tcas} + (1-H)*(\text{Tpre}+\text{Tras}+\text{Tcas}) \qquad (1)$$

where Tav is the average access time of the DRAM array, H is the average cache hit rate (i.e., the probability of a cache hit), Tcas is the column access time from the sense amplifiers, Tpre is the precharge time of the sense amplifiers, and Tras is the time required to transfer data from a row of DRAM cells to the sense amplifiers.

For a DRAM array which does not use the sense amplifiers as a cache memory, $$T_{av} = T_{ras} + T_{cas} \quad (2)$$

For most available DRAM, Tras–0.5 * Tpre. Consequently, the average cache hit rate (H) must be greater than 67 percent for the average access time of the cached system to be less than the average access time of the non-cached system. An even higher cache hit rate (H) is necessary to justify the complexity and cost introduced by the control logic required for the sense amplifier cache memory. Such a high average cache hit rate (H) is difficult to achieve and maintain in a multi-processor system due to frequent task switching. Such a high average cache hit rate is also difficult to achieve because the cache memory is inherently direct-mapped based on the direct coupling between the sense amplifiers and the memory cells of the DRAM array. For applications such as computer graphics, in which the amount of memory used is limited and there are several processors or processes, the cache hit rate can be quite low. In such applications, the short cache hit access time can be more than offset by the longer cache miss access time.

It is therefore desirable to have a cache memory for a multi-processor system which eliminates the dedicated cache memories of system 100, minimizes the cache thrashing problems of system 200, and minimizes the average memory access time.

SUMMARY

Accordingly, the present invention provides an improved structure and method of implementing a cache memory for a multi-processor system. The cache memory includes a main memory which is coupled to a main memory bus. A plurality of processors can also be coupled to the main memory bus. The main memory includes a plurality of memory banks, e.g., DRAM circuit module memory banks. The sense amplifiers of a predetermined number of banks are used as cache memory (i.e., sense amplifier cache lines). The number of banks used as sense amplifiers is substantially less than the total number of banks. For example, a main memory can include thirty-two banks, six of which are used as cache memory. The banks which are not used as cache memory are kept in a precharged state.

In such a memory system, there are three accessing possibilities. A cache-hit occurs when the data value to be accessed is stored in a sense amplifier cache line. A bank-miss occurs when the data value to be accessed is stored in a bank which is not currently being used as cache memory. A bank-conflict occurs when the data value to be accessed is stored in a bank which is being used as cache memory, but not in the row stored in the sense amplifier cache line. The average access time of this memory is the weighted average of cache-hit, bank-miss and bank-conflict access times. The access time for a cache-hit is equal to the column access time, the access time for a bank-miss is equal to the row access time plus the column access time, and the access time for a bank-conflict is equal to the precharge time plus the row access time plus the column access time. The probability that a cache-miss is also a bank-miss is relatively high, thereby resulting in a relatively low average access time.

The present invention also includes a cache tag table for managing the sense amplifier cache lines in the independent memory banks. A relatively small number of cache tag table entries is maintained compared to the large number of memory banks. Due to the small cache tag table, the complexity of cache control logic is minimized. Each of the system processors have one or more cache tag table entries to manage its memory/cache access. Processors which tend to have sequential data access can be assigned with one cache tag table entry, while other processors can have more cache tag table entries.

The present invention also includes address mapping for data values to be stored in the memory banks to reduce the probability of cache thrashing. The present invention also includes a method and structure for predicting the bank and row address of the next memory access, and prefetching this predicted bank and row into a sense amplifier cache line.

In addition, the present invention includes a cache control and access scheduling circuit. This circuit includes a plurality of servers, with one server dedicated to each of the processors or processes. Each of the servers contain the corresponding cache tag entries of the cache tag table. Each server receives memory requests from its associated processor and generates a signal which is sent out to all of the other servers to perform tag checking against the incoming address. The server then determines the necessary operations (e.g., PRE, RAS, CAS) depending on the check result. These operations are then executed in response to handshake signals generated by a transaction scheduler. The main handshake signals provided by the transaction scheduler cause the servers to Hold or Retry the currently pending access. In determining whether to issue Hold or Retry signals, the transaction scheduler examines such factors as the priority of the servers, and inputs from other system circuitry such as a command history logger and a inter-server dependency checker.

The inter-server dependency checker checks bank-conflicts between pending transactions from different servers. The command history logger stores the bank addresses of memory operations which have been started but not completed. Bank addresses of new memory operations are compared to the bank addresses stored in the command history logger to detect illegal timing or access sequences which may be caused by various commands of the incoming memory operation. In one embodiment, the command history logger includes a content addressable memory.

The present invention will be more fully understood in light of the following detailed description taken together with the drawings.

DETAILED DESCRIPTION

Figure 1:
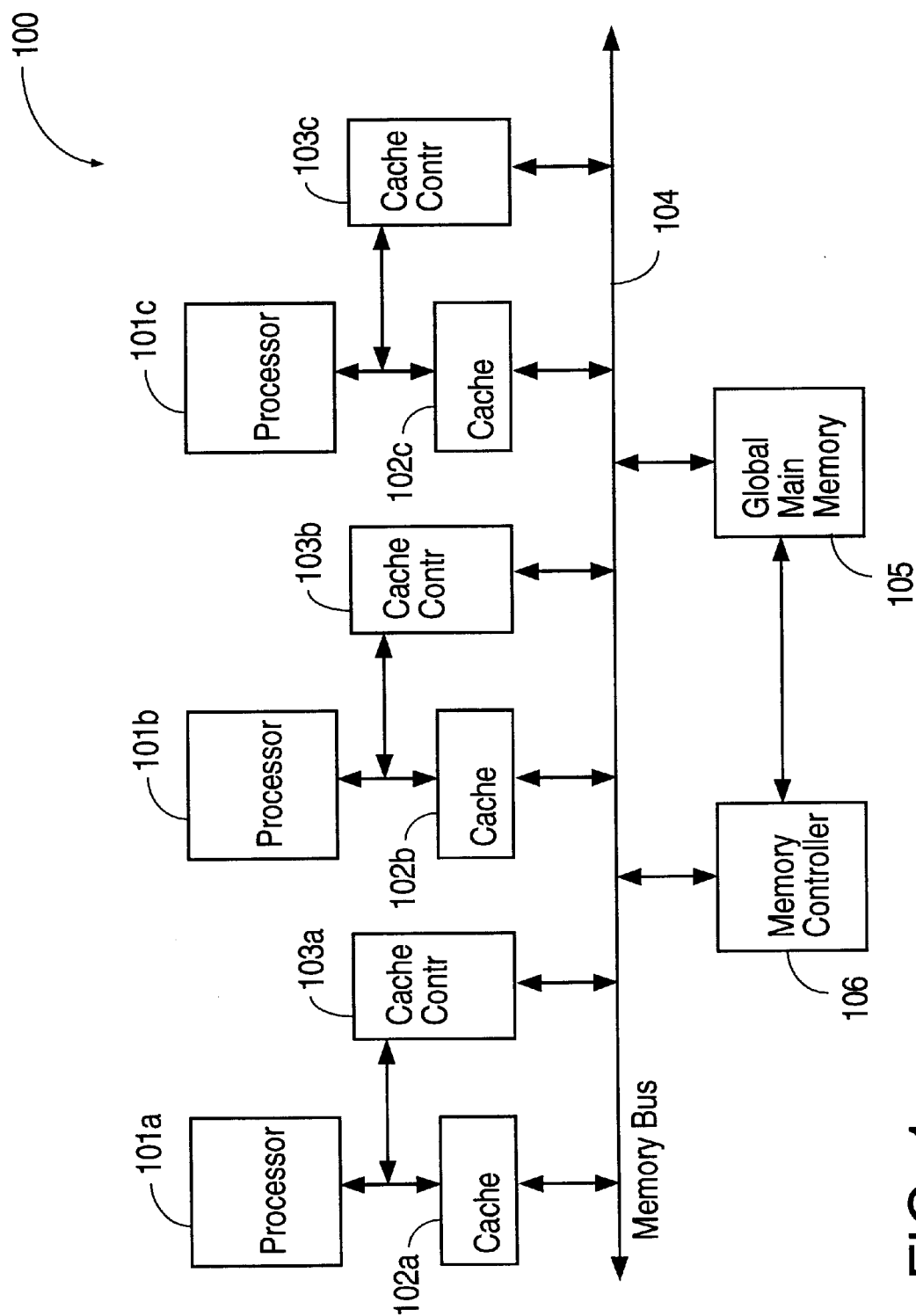
FIG. 1 is a block diagram of a conventional multi-processor system which employs a shared memory architecture.
Figure 2:
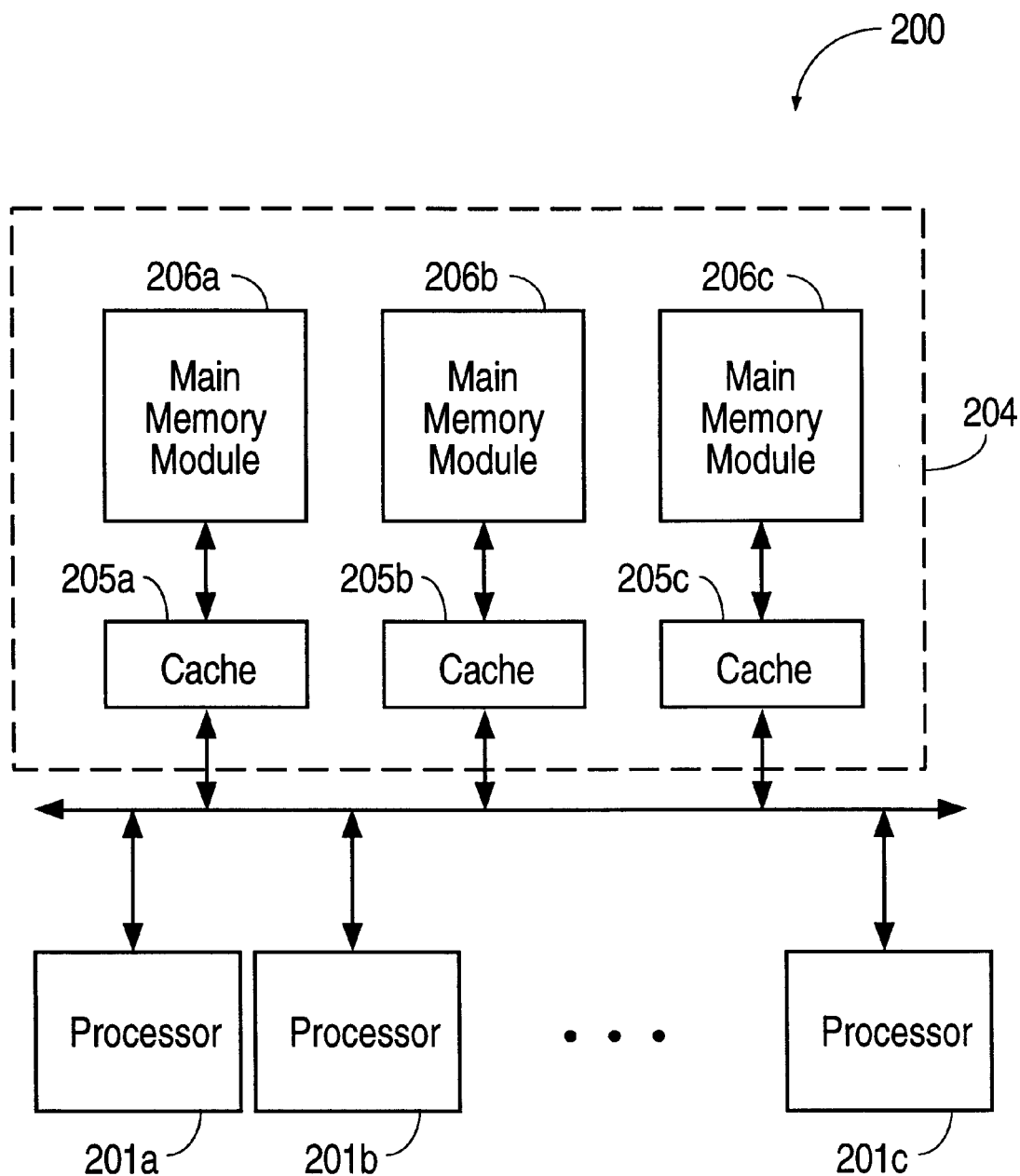
FIG. 2 is a block diagram of another conventional multi-processor system which includes a global main memory divided into modules.
Figure 3:
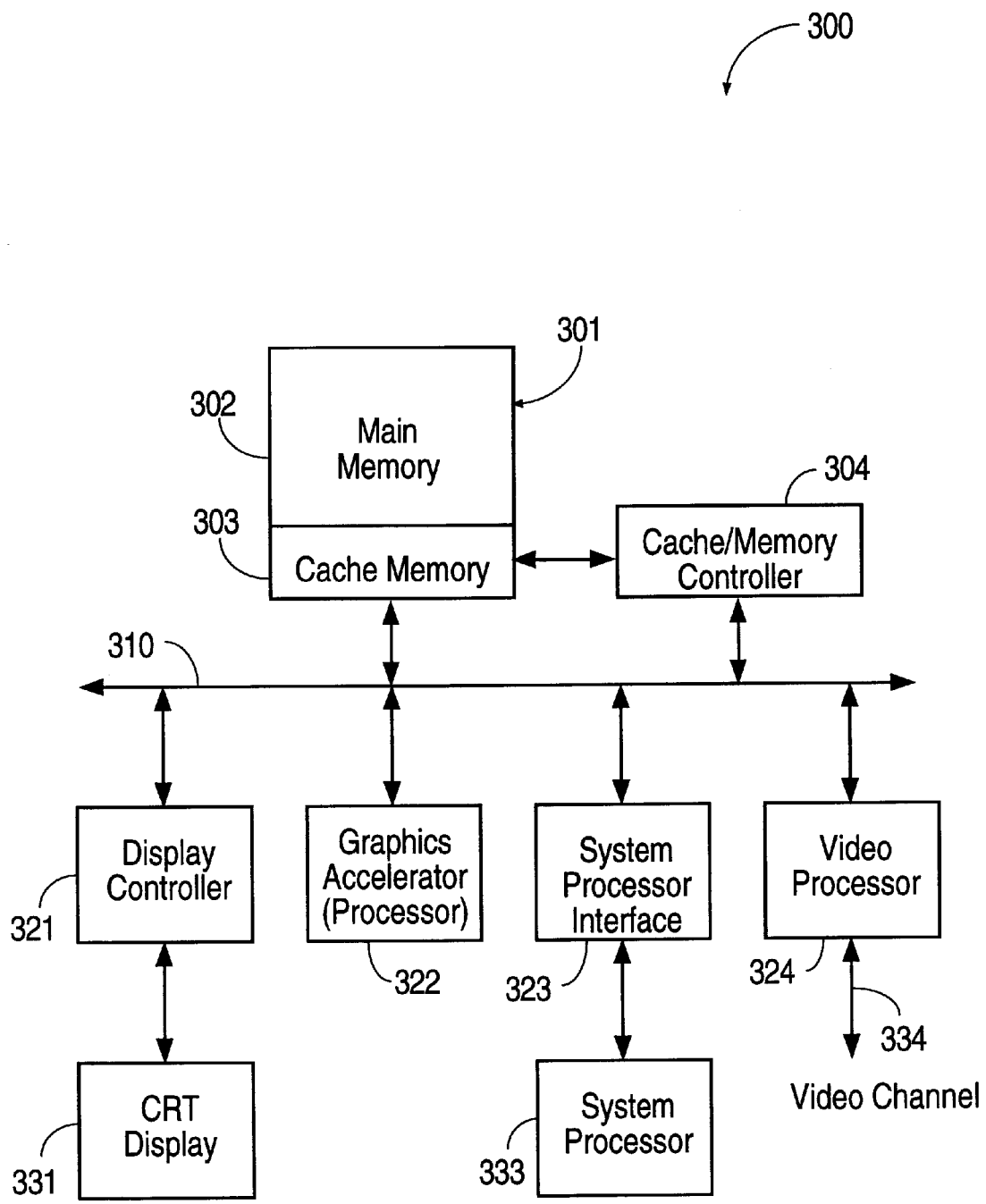
FIG. 3 is a block diagram of a multi-processor system in accordance with one embodiment of the present invention.

FIG. 3 is a block diagram of a multi-processor system 300 in accordance with one embodiment of the invention. Although system 300 is illustrated as a computer graphics system, other systems are contemplated. System 300 has multiple conventional processors, which include display controller 321, graphics accelerator 322, system processor 333 and video processor 324. Display controller 321, graphics accelerator 322 and video processor 324 are coupled directly to main memory bus 310. System processor 333 is coupled to main memory bus 310 through a conventional system processor interface circuit 323. Display controller 321 is also coupled to CRT display 331. Video processor 324 is also coupled to video channel 334. DRAM memory 301 and memory controller 304 are also connected to main memory bus 310. In addition, memory 301 is attached to memory controller 304. In one embodiment, all of the elements of system 300 except for memory 301 are integrated into a single chip. In system 300, memory 301 is typically used as a frame buffer memory to store a complete frame of video information. The performance of system 300 is typically limited by the bandwidth of memory 301. The cache memory operation is therefore incorporated into memory 301 to increase the overall bandwidth of memory 301. The sense amplifiers of DRAM memory 301 are used as cache memory to minimize the cost of the cache memory.

Figure 4:
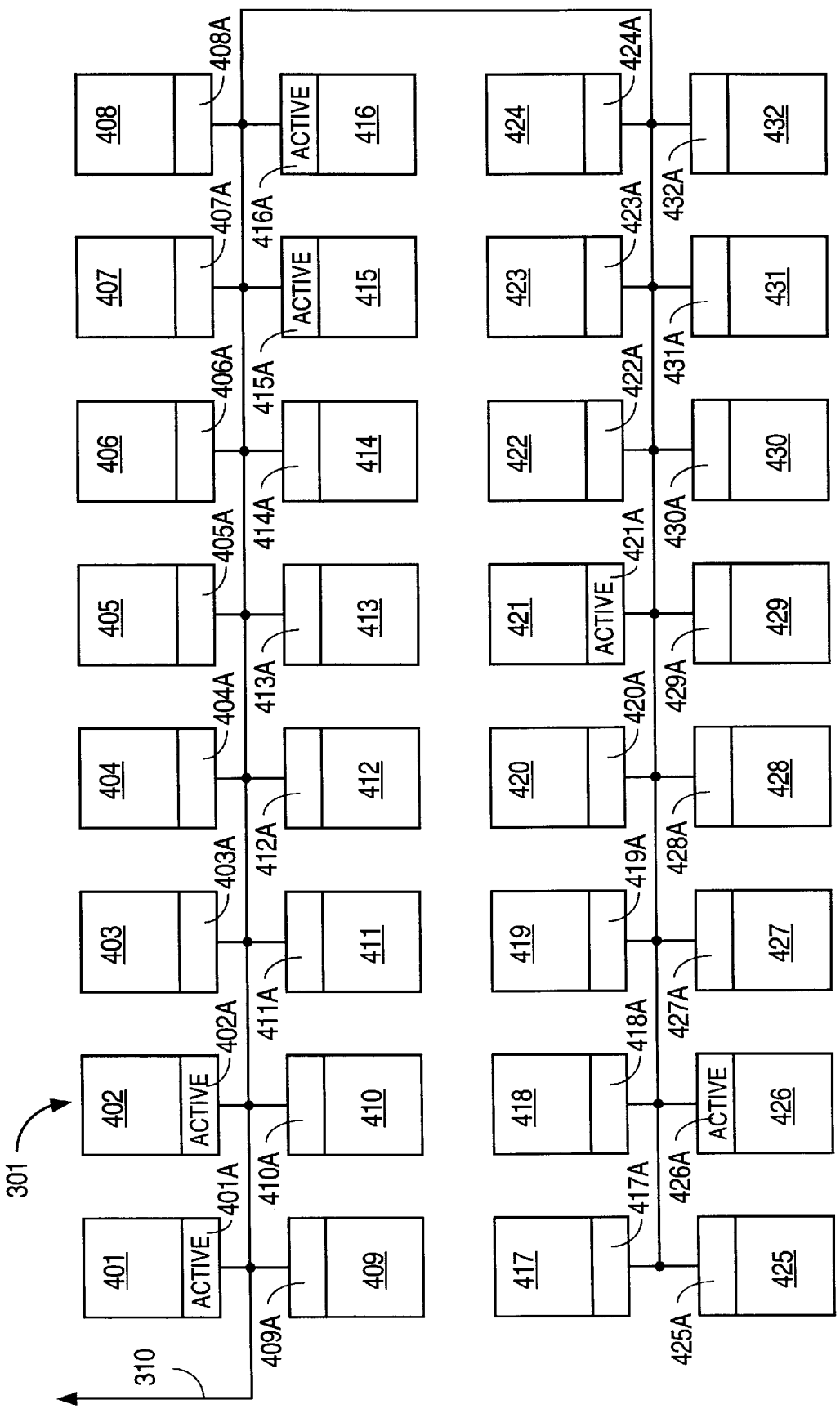
FIG. 4 is a block diagram of the memory of the multi-processor system of FIG. 3 in accordance with one embodiment of the invention.

FIG. 4 is a block diagram illustrating memory 301 in accordance with one embodiment of the invention. Memory 301 utilizes a circuit module architecture which includes a plurality of DRAM memory banks 401–432 connected in parallel to main memory bus 310. Details of the internal structure and operation of DRAM memory banks 401–432 are described in commonly owned U.S. patent application Ser. No. 08/270,856, entitled "Directional Asymmetric Signal Swing Bus System for Circuit Module Architecture", by Wingyu Leung, Winston Lee, and Fu-Chieh Hsu, filed Jul. 5, 1994, now U.S. Pat. No. 5,655,113, issued Aug. 5, 1997 which is hereby incorporated by reference in its entirety. Each of DRAM memory banks 401–432 is independently operated and has its own sense amplifier circuit 401*a*–432*a*. Sense amplifier circuits 401*a*–432*a* are used to implement high performance, low complexity cache memory system. As described in more detail below, this cache memory system minimizes the average access latency and the data traffic on bus 310. As a result, the usable bandwidth of bus 310 is maximized for a multi-processor system with shared memory (e.g., system 300).

In accordance with the present invention, a relatively large number of independent memory banks (N) serve a relatively small number of processors or processes (P). In the embodiment illustrated in FIG. 4, memory 301 provides thirty-two independent memory banks 401–432 (N=32) for four processors 321, 322, 333 and 324 (P=4). Each of memory banks 401–432 has 1024 columns and 256 rows. The 1024 columns are divided into 128 8-bit bytes. Thus, memory banks 401–432 provide approximately 1 Mbyte of storage.

In accordance with the present invention, the sense amplifiers of a relatively small number (T) of memory banks 401–432 are used as cache memory. In one embodiment, the sense amplifiers of six of memory banks 401–432 are used as cache memory (T=6). Thus, six of memory banks 401–432 are maintained with a row of data stored in their associated sense amplifiers. FIG. 4 illustrates a moment in time at which cache lines 401*a*, 402*a*, 415*a*, 416*a*, 421*a* and 426*a* have active cache lines. The remaining 28 memory banks are maintained in a precharged condition.

The average access time (Tav) for memory 301 is the weighted average of cache-hit, bank-miss and bank-conflict access times. A cache-hit is defined as a memory access in which the data of the addressed bank and row are stored in a sense amplifier cache memory (i.e., bank-hit and row-hit). A bank-miss is defined as a memory access in which the addressed bank and row exist in a memory bank which is not currently being used as cache memory. A bank-conflict is defined as a memory access in which the addressed memory bank is being used as cache memory, but the addressed row is not the row stored in the sense amplifiers (i.e., bank-hit and row-miss) Equation (3) below sets forth the equation for the average access time (Tav) for memory 301.

$$\text{Tav} = H^*\text{Tcas} + M^*(\text{Tras}+\text{Tcas}) + (1-H-M)^*(\text{Tpre}+\text{Tras}+\text{Tcas}) \quad (3)$$

In equation (3), H is the cache-hit rate, M is the bank-miss rate, and Tpre, Tras and Tcas are the times required to precharge the sense amplifiers, perform a row access operation and perform a column access operation, respectively, within one of memory banks 401–432. In a simplified model with random accesses between processors, the probability that a cache-miss is also a bank-miss is M/(1−H) or approximately (N−T)/N. In the embodiment where N=32 and T=6, the probability that a cache-miss is also a bank miss is therefore approximately 81%. As a result, equation (3) can be transformed into $$Tav = H*Tcas + (1-H)*\{0.81*(Tras+Tcas) + \quad (4)$$
$$0.19*(Tpre+Tras+Tcas)\}$$

As indicated by equation (4), a relatively low cache-hit rate (H>27.5%) is sufficient to yield higher performance than the non-cached scheme defined by equation (2).

Figures 5, 6A:
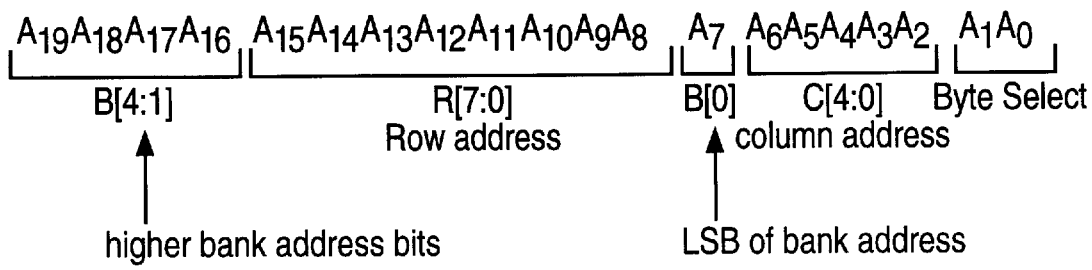
FIG. 5 is a schematic diagram of a cache tag table associated with the memory of FIG. 4 in accordance with one embodiment of the invention.
FIGS. 6a and 6b are schematic diagrams illustrating address mapping of the memory of FIG. 4 in accordance with one embodiment of the invention.

A cache tag table is established to manage the sense amplifier cache lines in the independent memory banks. A relatively small number of cache tag table entries (e.g., six) is maintained compared to the large number of memory banks (e.g., thirty-two). Due to the small cache tag table, the complexity of cache control logic in cache/memory controller 304 (FIG. 3) is minimized. FIG. 5 shows a cache tag table 500 in accordance with one embodiment of the invention. Cache tag table 500 includes T entries, each entry containing a bank number, a row number and one or more status bits. Thus, in the present embodiment, six cache tag memory entries are used for thirty-two memory banks. Each of processors 331, 322, 333 and 324 have one or more cache tag table entries to manage its memory/cache access. Each cache tag table entry contains a bank number (8 bits in one embodiment for up to 8 Mbytes of memory), a row (cache line) number (8 bits in one embodiment), and one or more status bits for DRAM refresh management and cache line status management.

In a particular embodiment, both display controller 321 and video processor 324 are assigned with one cache tag table entry each because of their data access behavior, which tend to be sequential (i.e., each data access is consecutive in address locations and continues from the previous access). Graphics accelerator 322 and system processor 333 are assigned with two entries each. Since any given processor has at most two cache lines in memory 301, the probability of a single processor thrashing the cache lines and slowing down the operation of memory 301 is minimized. The particular cache tag table assignments listed above are simplified for purposes of presenting an example. There may be numerous processors coupled to bus 310 which require little data bandwidth and therefore have no associated cache tag table entry. Other numbers of cache tag table entries can also be used to match the respective bandwidth and access requirements of the processors. It may also be desirable to have several processors sharing several cache tag table entries among them in a non-dedicated fashion.

Most of the accesses from a given processor have good locality correlation (i.e., consecutive accesses tend to be sequential), while accesses from different processors tend to be random. The caching method in the present invention is particularly effective in maintaining high cache-hit rate with a small cache tag table because different processors have dedicated cache tag table entries. Moreover, because the number of memory banks (N) is larger than the number of cache tag entries (T), a substantial number of banks 401–432 (i.e., N–T) stay in a precharged state to minimize the penalty in access time from cache-misses.

Prefetch Scheme

To take advantage of the sequential access behavior of certain processors, such as display controller 321 and video processor 324, a prefetch scheme can be implemented. An address detection circuit (i.e., a comparator) is used to monitor the address of the current access. If the detection circuit indicates that the current access reaches the end of the current cache line, the current cache line is precharged after the current access is complete, and a new cache line which contains the data for the next address is fetched. Cache tag table 500 is updated accordingly to reflect the execution of such a cache line prefetch. Since sequential access behavior guarantees high access probability for the prefetched data in the new cache line, the cache-hit rate is thereby increased.

Address Mapping Scheme for Decreasing the Probability of Bank Conflict

If a cache-miss occurs and the required data is located in a memory bank whose cache line is presently occupied (i.e., the bank is in the activated state with a different row number stored in the sense amplifiers), the longest possible access latency exists (i.e., Tpre+Tras+Tcas). In a typical display-oriented system, pixels located horizontally next to the pixel currently being accessed have a high probability of being accessed subsequently by the same processor. Access latency is therefore reduced if horizontally neighboring pixels are stored in the same cache line. Due to the finite size of the cache line (e.g., 128 bytes in a preferred embodiment), boundary conditions occur when neighboring pixels are stored in different cache lines of the same memory bank. To eliminate bank-conflicts due to sequential accesses across cache line boundaries from the same processor, consecutive cache lines are mapped into different memory banks.

Figure 6B:
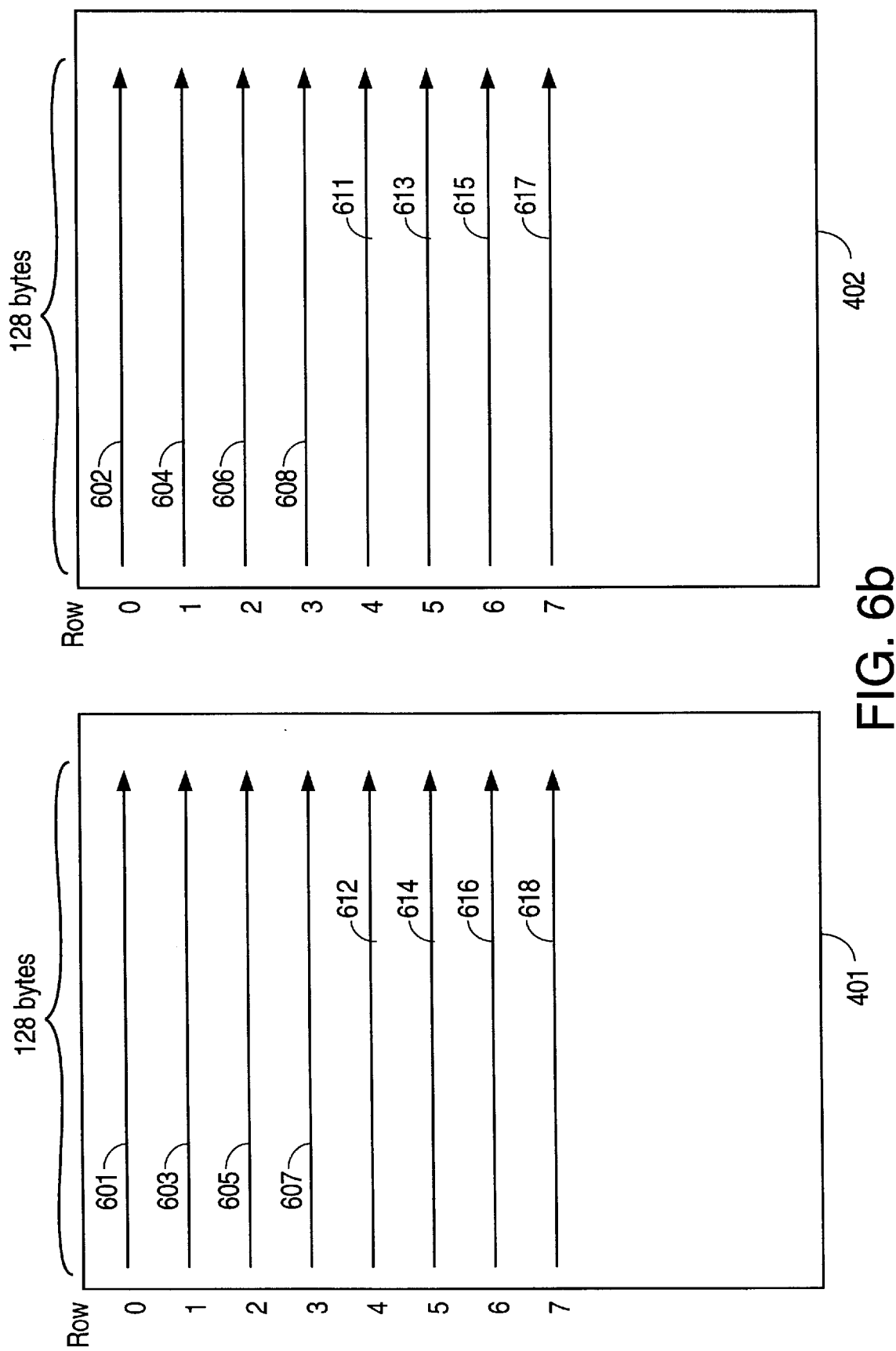

FIGS. 6a and 6b illustrate one address mapping scheme in accordance with the invention. As shown in FIG. 6a, this address mapping scheme provides a 20-bit address for each pixel. The seven least significant bits A6–A0 are used to define the column position of the pixel in the memory bank. The column position is divided into a five bit column address A6–A2 and a two bit byte select address A1–A0. As a result, address bits A6–A0 define 128 consecutive byte positions in the memory bank. Address bit A7 defines the least significant bit of the memory bank address. Address bits A15–A8 define one of 256 row addresses. Address bits A19–A16 define the most significant bits of the memory bank address.

FIG. 6b illustrates the mapping of pixel intensity values within two memory banks 401 and 402 which occurs as a result of the addressing scheme of FIG. 6a. The first 128 horizontally consecutive pixel intensity values are stored in row 0 of memory bank 401 as illustrated by line 601. Address bit A7 then changes value and the next 128 horizontally consecutive pixel intensity values are stored in row 0 of memory bank 402 as illustrated by line 602. Address bits A7 and A8 then both change value, thereby causing the next 128 horizontally consecutive pixel intensity values to be stored in row 1 of memory bank 401 as illustrated by line 603. This continues with horizontally consecutive pixels being sequentially stored in row 1 of memory bank 402 (see, line 604), row 2 of memory bank 401 (see, line 605), row 2 of memory bank 402 (see, line 606), row 3 of memory bank 401 (see, line 607), and row 3 of memory bank 402 (see, line 608). After line 608 is completed an entire horizontal row (i.e., 1024 bytes) of consecutive pixel intensity values has been written into memory banks 401 and 402. The boundaries between consecutive pixel intensity values introduced by banks 401 and 402 are located such that a bank-conflict will not exist when accessing horizontally consecutive pixel intensity values.

Since neighboring pixels exist in both the horizontal and vertical directions, the address mapping scheme of FIGS. 6a and 6b stores horizontally neighboring pixels in the same cache line of different banks. However, this does not guarantee that neighboring pixels in the vertical direction will be in different banks. As previously described, in a display system having a screen resolution of 1024'768 pixels and a pixel depth is 8 bits, one horizontal display line requires 1024 bytes of memory corresponding to 8 cache lines of 128 bytes each. If the address mapping described in FIG. 6a is unmodified, all neighboring pixels in the vertical direction are located in different cache lines of the same bank, thereby causing sequential accesses in the vertical direction to have a worst case bank-conflict access latency. To alleviate this problem, a simple address re-mapping scheme is introduced having the function of:

A7=NOT A7, if A10=1; and A7=A7, if A10=0.

With this address re-mapping function, neighboring pixels in the vertical direction are stored in different banks. Thus, continuing the example of FIG. 6b, when the second horizontal scan line of 1024 pixel intensity values is to begin (i.e., after line 608 is completed), address bit A10 changes from a logic "0" value to a logic "1" value. As a result, the address re-mapping scheme, causes the first 128 pixel intensity values of the second scan line to be stored in row 4 of memory bank 402 as illustrated by line 611. Addressing then continues as previously described, with horizontally consecutive pixels being sequentially stored in row 4 of memory bank 401 (see, line 612), row 5 of memory bank 402 (see, line 613), row 5 of memory bank 401 (see, line 614), row 6 of memory bank 402 (see, line 615), row 6 of memory bank 401 (see, line 616), row 7 of memory bank 402 (see, line 617) and row 7 of memory bank 401 (see, line 618). After line 618 is completed another entire horizontal row (i.e., 1024 bytes) of consecutive pixel intensity values has been written into memory banks 401 and 402. The ordering of these pixel intensity values is arranged such that a bank-conflict will not exist when accessing vertically consecutive pixel intensity values.

Statistically, in the simple model of four processors executing from a shared memory, the probability that the cache line of any one of the processors remains available (i.e., not thrashed or replaced by the other processors) after the other three processors have executed their respective data access is:

$$\text{Probability of no bank collision} = (1-1/N)^{**}(P-1) \quad (5)$$

where N and P were defined earlier. For the previously described embodiment of the present invention N=32 and P=4. In this embodiment the probability of no bank collision is 91%, which is the cache-hit rate possible with proper address mapping and prefetch algorithms. In contrast, a traditional system with no independent banks has a probability of no bank collision of 0% and a conventional system having four independent banks has a probability of no bank collision of 32%. Again, because N is much larger than P in the present invention, the probability of bank thrashing is relatively small, thereby allowing for a higher cache-hit rate.

Figure 7:
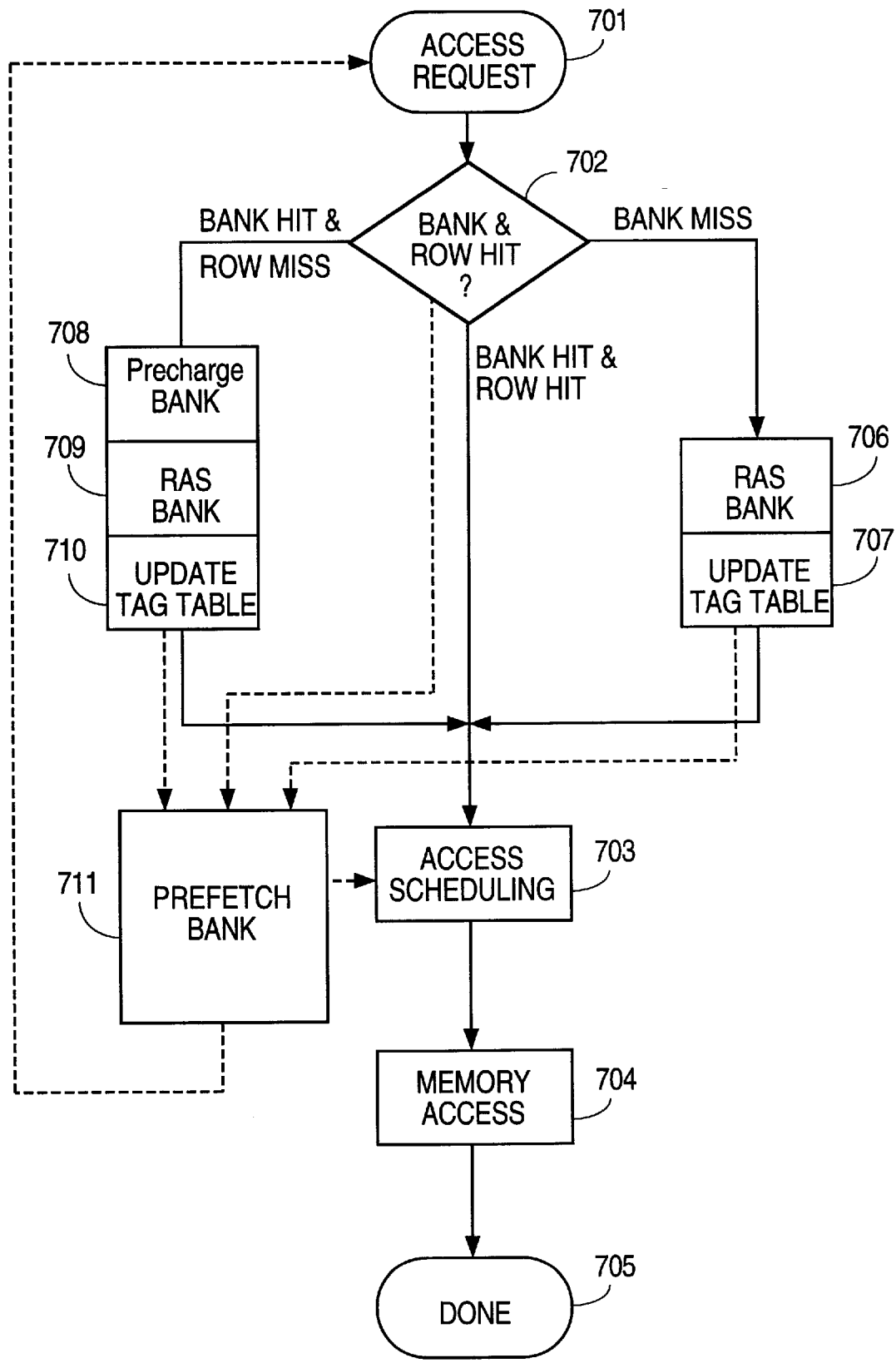
FIGS. 7 and 8 are flow diagrams describing the operation of the memory of FIG. 4 in accordance with one embodiment of the invention.

FIG. 7 illustrates a method of controlling caching operations in a multi-bank memory system in accordance with one embodiment of the invention. Upon receiving read or write access request from processors 321, 322, 333 and 324 (Step 701), cache/memory controller 304 (FIG. 3) checks for bank-hit and row-hit conditions by comparing the incoming address with the contents of cache tag table 500 (FIG. 5) (Step 702). There are three possible outcomes.

First, a cache-hit can exist (i.e., both bank and row numbers of the incoming address match one of the entries in cache tag table 500). In this situation, data access scheduling is performed (Step 703), followed by an access from the corresponding sense-amplifier cache line in memory 301 (Step 704). The method is then complete (Step 705) until another access request is received (Step 701).

Second, a bank-miss can exist (i.e., the bank number of the incoming address does not match any of the bank numbers in cache tag table 500). In this situation, a RAS (row access) operation is performed on the bank addressed (Step 706) and cache tag table 500 is updated (Step 707). Steps 703–705 are then performed to access data from the newly established cache line.

Third, a bank-conflict can exist (i.e., the bank number of the incoming address matches one of the entries of cache tag table 500, but with different row number). In this situation, a precharge operation is performed to clear the cache line of the addressed bank (Step 708). A RAS operation is then performed on the address bank using the addressed row (Step 709) and cache tag table 500 is updated (Step 710). Steps 703–705 are then performed to access data from the newly established cache line.

Before or during each data access, an optional prefetch step 711 can be performed to determine which of memory banks 401–432 to prefetch in anticipation of future accesses. The purpose of prefetch step 711 is to increase the cache-hit rate and therefore the performance of memory 301. Because bank prefetch in the present invention does not require physical data access to and from memory 301, little memory bus bandwidth is consumed. This is different from prior art prefetch methods where physical data are transported to the cache or prefetch buffer in the cache/memory controller. As a result, there is much less time penalty associated with an incorrect prefetch as compared to prior art methods. The present invention therefore provides a simple and efficient prefetch method and high resultant cache-hit rate.

Figure 8:
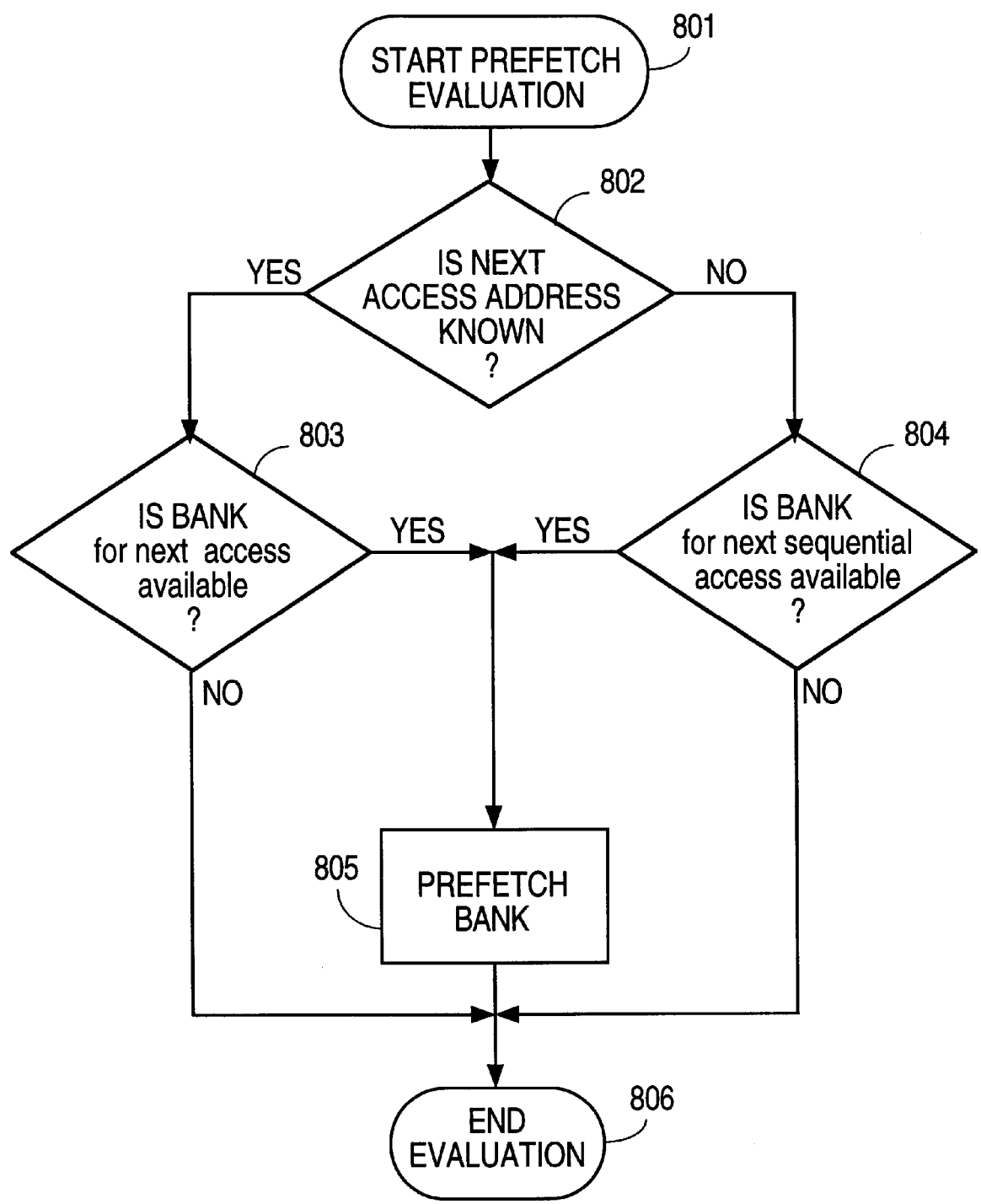

FIG. 8 illustrates one embodiment of prefetch method 711 in accordance with the invention. For performance considerations, prefetch step 711 is implemented only for processors with predictable access patterns or critical bandwidth requirements. Prefetch evaluation starts with Step 801. If the next access address (from the same processor) is known (Step 803) or predictable (Step 804) and is expected to be outside of the current cache line (Step 802), the targeted prefetch bank is checked to see if it is available (Step 803). If the bank is available (i.e., not currently in use, or locked by other processor, or cached by other processor), then prefetch bank step 805 places a new cache line ready for future access. The prefetch evaluation is then complete (Step 806) In general, two or more cache tag entries are reserved for each processor with bank prefetch capability, such that bank prefetch can be initiated without destroying the current cache line. However, the current cache line will be destroyed in those processors having predictable sequential accesses for which one cache tag entry is used.

Variations from the basic prefetch algorithm as shown in FIG. 8 may also be implemented. For example, if the present processor being evaluated in prefetch step 711 has a higher priority than another processor presently caching the targeted prefetch bank, the present processor may evict the other processor and gain control of the bank.

The method illustrated in FIG. 7 corresponds to a single access request. However, in multi-processor system 300, there may be several access requests pending simultaneously. Thus, cache/memory controller 304 allows the pending requests to be processed in parallel for improved system throughput. As described in more detail below, cache/memory controller 304 allows access requests to be split and re-arranged to maximize memory data bandwidth. For example, the RAS and Precharge operations required due to bank-miss, bank-conflict or prefetch can be re-ordered and interspersed in between data accesses from the different processors to DRAM 301 to minimize dead time (wait time) on the memory bus and maximize the cache access bandwidth.

Figure 9:
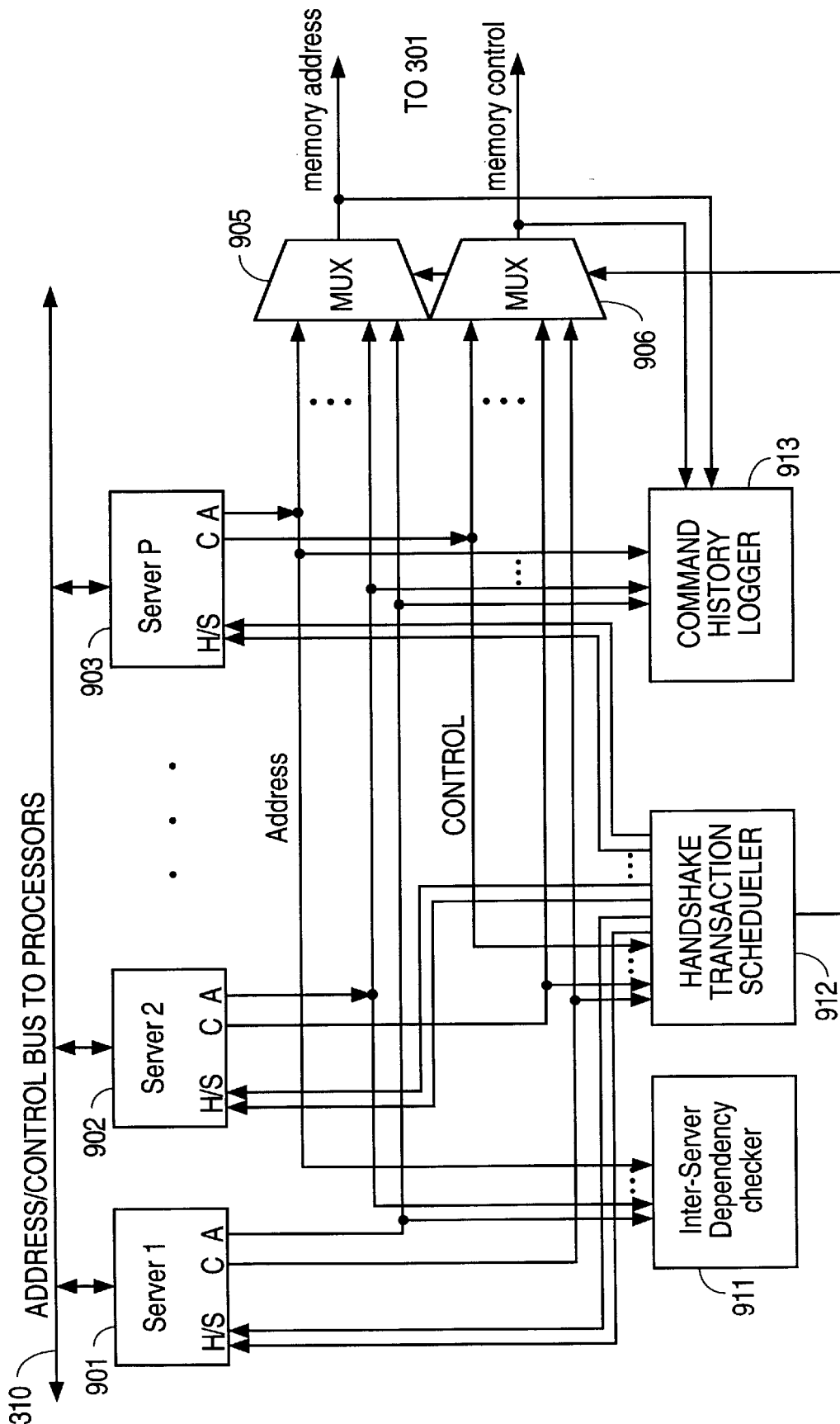
FIG. 9 is a schematic diagram of control logic for the memory of FIG. 4 in accordance with one embodiment of the invention.

FIG. 9 is a block diagram of one embodiment of cache control and access scheduling circuit 900 present in cache/memory controller 304. FIG. 9 illustrates address and control signals, but omits data signals for purposes of clarity. Circuit 900 includes P servers 901–903, each serving one of the processors or processes. In the embodiment previously described, P is equal to four. Each of servers 901–903 contain the corresponding cache tag entries of cache tag table 500. Each of servers 901–903 are coupled to memory address multiplexer 905, memory control multiplexer 906, inter-server dependency checker 911, transaction scheduler 912 and command history logger 913.

Cache control and access scheduling circuit 900 is responsible for processing memory accesses from the P processors (e.g., display controller 321, video processor 324, graphics accelerator 322, system processor 333, etc.) which have access to shared memory 301. Associated with each processor is a server which takes the memory requests from its associated processor, processes the transaction address, interfaces with transaction scheduler 912 and formats the memory commands. Transaction scheduler 912 controls multiplexers 905 and 906 to select appropriate address and control signals from one of the P servers 901–903 to be sent to the memory system 301. Handshake signals, such as Hold, Retry, Data-Ready, Conflict, Tag-Check, etc., are provided by transaction scheduler 912 to each of servers 901–903 to control the respective operations of these servers 901–903.

Figure 10:
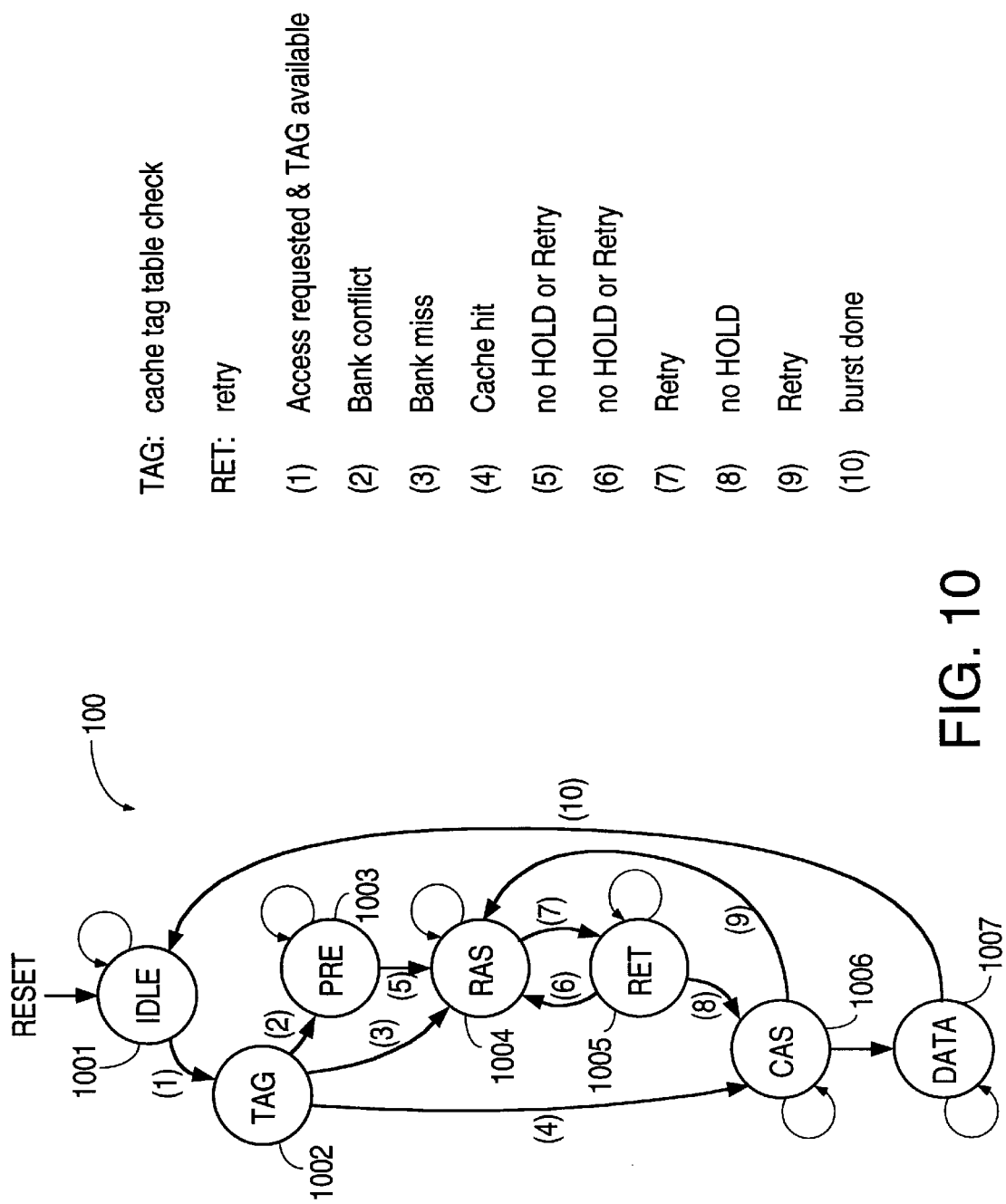
FIG. 10 is a state diagram of the operation of the server blocks of FIG. 9.

FIG. 10 is a state diagram 1000 which describes the operation of each of servers 901–903 in accordance with one embodiment of the invention. When a memory access request is detected from a processor, arbitration is performed in case multiple processors simultaneously make memory access requests. The server associated with the processor making the access request is then activated from idle state 1001. A Tag-Check signal is driven out to all of the other servers to perform tag checking against the incoming address (State 1002). The incoming address is also sent to Inter-Server Dependency Checker circuit 911 to check for bank-conflict between the new transaction with other on-going or pending transactions (State 1002). Each access request is checked with cache tag table 500 (State 1002) and, depending on the check result, the access request is split into individual operations (PRE, RAS, CAS and DATA). Each of these operations will be executed based on the hand-shake signals generated by transaction scheduler 912.

If the server detects a cache-hit on a cache line associated with the requesting processor, the server starts the memory access with the CAS (column access) command (State 1006). After the CAS command is issued, data can be read out of memory 301 (State 1007). If the server detects a bank-miss, the server starts the memory access with a RAS (row access) command (State 1004). If the server detects a bank-conflict, the server starts the memory access with a PRE (precharge) command (State 1003). The main hand-shake signals provided by transaction scheduler 912 to each of servers 901—901 include a Hold signal and a Retry signal. In general, a server receiving a Hold signal places the currently pending operation in state diagram 1000 on hold. A server receiving a Retry signal will proceed to state 1004 and attempt to retry a previously requested memory access, beginning with a RAS command. The Retry signal is used when a cache line is destroyed by another processor before the requested memory access can be performed. Using the Hold and Retry signals, transaction scheduler 912 has the ability to mix and rearrange individual operations from the multiple servers 901–903 for execution in an optimal fashion. The operation of transaction scheduler 912 is described in more detail below.

Figure 11:
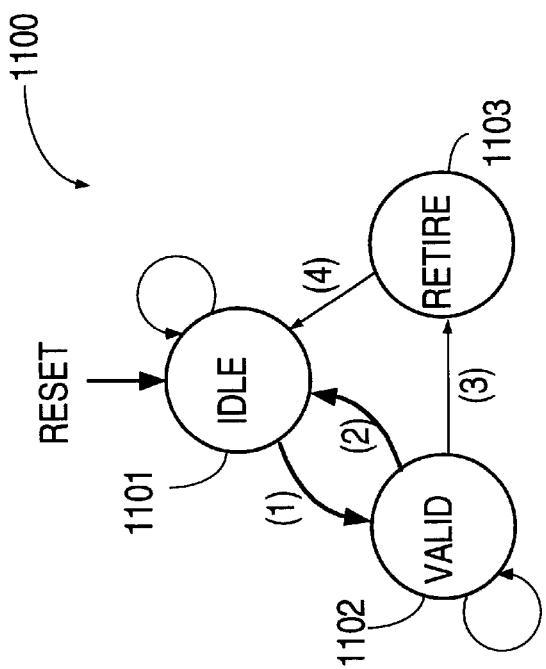
FIG. 11 is a state diagram of the operation of a cache tag table in accordance with the invention.

As each access request is being processed, the content of the entries in cache tag table 500 are updated accordingly by servers 901–903. FIG. 11 is a state diagram 1100 for updating cache tag table 500 in accordance with one embodiment of the invention. A status bit in cache tag table 500 can be used to indicate validity of the tag entry and to facilitate the arbitration of accesses from multiple servers 901–903. In state diagram 1100, a cache line can be in a valid, an invalid or a being retired state. The cache line can only go from invalid (State 1101) to valid (1102) at the end of a cache-hit access, or an optional prefetch operation, when there is no server waiting on the bank. Moreover, the cache line can only be retired (State 1103) (i.e., a cache line can be destroyed) when it is valid. The cache line is changed from valid to invalid (State 1101) during a cache-hit access or during a bank-conflict. By changing the cache line to invalid during this time, the associated server prevents other servers from retiring the cache line until the cache-hit access is completed or until the bank-conflict no longer exists.

The operation of transaction scheduler 912 in accordance with one embodiment can be described as follows for each server. If the bank requested by the server is in use by another server having a higher priority than the requesting server, and a data burst has not been started by the other server, the transaction scheduler 912 will issue a Retry signal to the requesting server. However, if transaction controller 912 receives an access request from a server having a higher priority than the requesting server, or transaction controller 912 receives a Hold command from command history logger 913 (as described in more detail below), or transaction controller 912 receives a dependency hold command from inter-server dependency checker 911 based on another server having a higher priority (also described in more detail below), or if a data burst is currently taking place, transaction scheduler 912 will issue a Hold signal to the requesting server. The operation of transaction scheduler 912 with respect to each processor is also described by the following pseudo code.

```
To Server (x) :
    If (bank in use by Server with higher
    priority AND burst not started)
        {Retry (x)}
    else if (request from Server with higher
            priority
        OR hold by command history logger
        OR hold by dependency checker from
        Server with higher priority
        OR burst active)
        {Hold (x)}
    else if (Server (x) has pending command)
        {Select address of Server (x)
        Select command of Server (x)}
```

Inter-server dependency checker 911 and command history logger 913 assist the transaction scheduler 912 in executing optimal transaction scheduling. Inter-server dependency checker circuit 911 checks bank-conflicts between pending transactions from different servers. All pending transactions from each of servers 901–903 are compared. In response, inter-server dependency checker 911 issues signals indicating pairwise conflicts between transactions. These signals are used by transaction scheduler 912 to generate the independent Hold and Retry signals to different servers. A Hold signal is transmitted from transaction scheduler 912 to the server associated with a new transaction when a conflict is detected. A Retry signal is transmitted from transaction scheduler 912 to those servers that must start the pending transaction from the beginning because the pending transaction was pre-empted by a server or servers with higher priorities. The pseudo code for the Inter-Server Dependency Checker is shown as follows:

```
If (bank address of Server (x) EQUAL bank
address   of Server (y))
        {issue dependency Hold}
```

Command history logger circuit 913 logs the bank address of the memory operations that have been sent to memory 301 through multiplexers 905 and 906, but which have not been completed. The bank addresses of new memory operations are compared to the bank addresses stored in command history logger 913. If the bank address of the new memory operation matches the bank address of a previous memory operation, and the new memory operation would create an illegal access sequence or result in illegal timing within the memory bank, the new memory operation will be placed on hold until the conflict has been retired. In a multi-bank memory system, such as system 300, each of memory banks 401–432 can be operated independently. For example, within memory banks 401–432, precharge, RAS and CAS operations are independently performed. However, a minimum time period or number of clock cycles is required between certain operations to the same bank. For example, after performing a RAS operation, three clock cycles must elapse before a CAS operation can be performed. Moreover, after performing a RAS operation, six clock cycles must elapse before a precharge operation is performed. It is critical to ensure all such timing parameters are met and legal sequences are used for all memory accesses, especially because transaction scheduler 912 has the ability to split and rearrange accesses from multiple processors.

Figure 12:
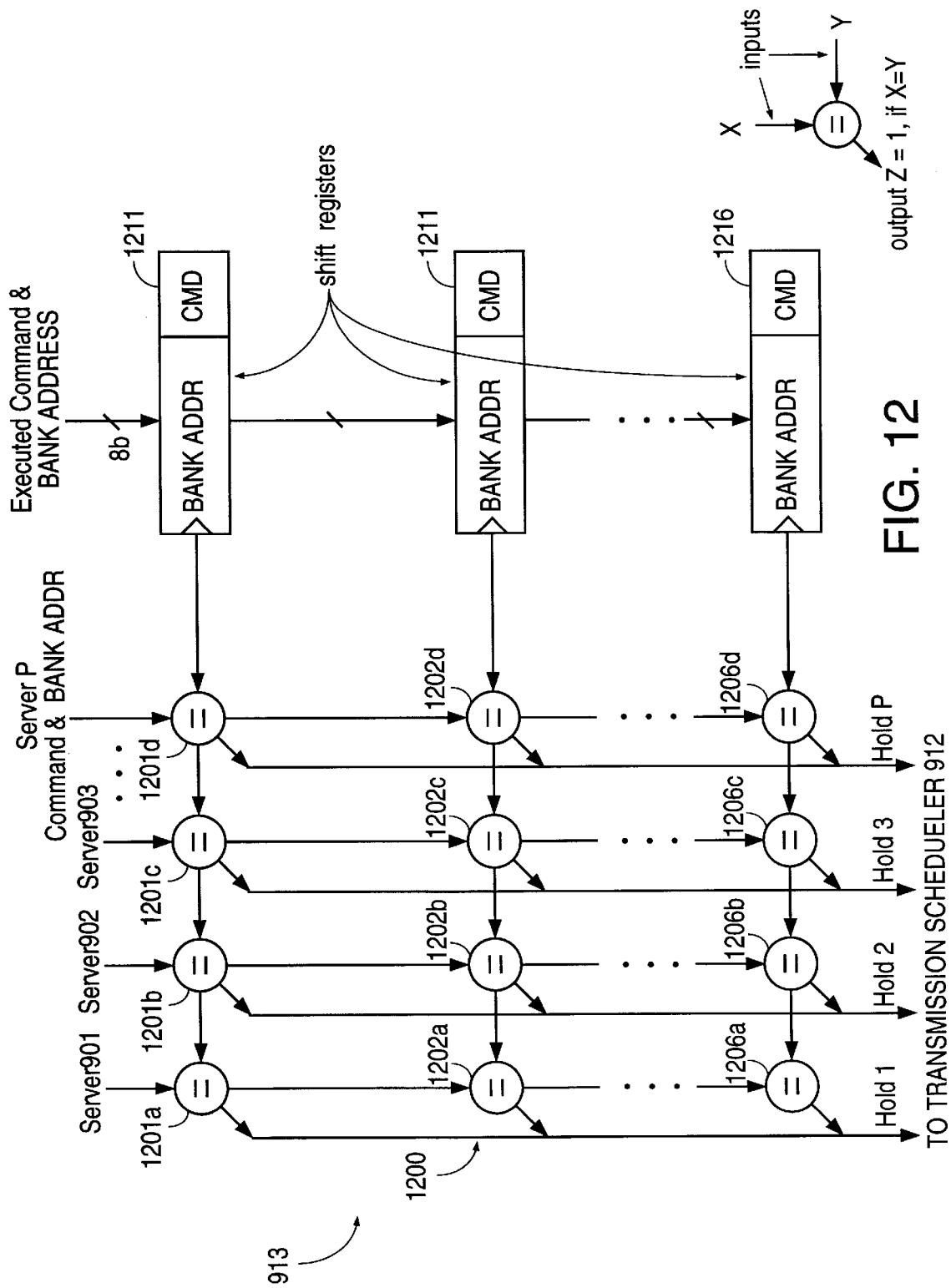
FIG. 12 is a schematic diagram of the command history logger of FIG. 9.

FIG. 12 is a schematic diagram of one embodiment of command history logger 913. In this embodiment, command history logger 913 includes a 6-entry 4-port content-addressable memory (CAM) 1201. The entries are arranged as a shift register clocked by an internal memory control clock (not shown). The number of entries in CAM 1201 is dictated by the longest latency of all the memory operations. In the present example, the longest latency is six clock cycles required from a RAS operation to a precharge operation.

When a memory access is performed in memory 301, a control word having a bank address field and a control field is transmitted to shift register 1211 of command history logger 913. The bank address field contains the bank address of the current access and the command field has one or more bits set to correspond to a command type of the current access, such as PRE, RAS, CAS, RAS-low, etc. The bank address and command type are propagated through shift registers 1212–1216 in response to the clock signal (i.e., at a rate of one shift register per clock cycle). The bits in the command field are reset at time intervals specified by a memory control register (not shown). The memory control register specifies the legal timing parameters in number of clock cycles for each of the command types. Once an entry reaches a shift register having a depth corresponding to a legal timing parameter, the corresponding command field bits are reset. Invalid entries with all of the command field bits cleared are not checked.

CAM 1200 also receives the bank addresses and command types of the requested memory accesses from the P servers (i.e., servers 901–903). The bank addresses and command types from servers 901–903 are compared with the bank address and command types in shift registers 1211–1217 to determine if a timing violation exists within any bank. If a timing violation exists for a given bank, the memory access requested by the server cannot be processed and a hold signal is generated and provided to transaction scheduler 912.

For example, if memory 301 began performing a RAS operation in bank 401 one clock cycle ago, shift register 1211 would contain the bank address of bank 401 and a command type representative of a RAS operation. If, at this time, server 901 requests that a CAS operation be performed in bank 401, server 901 will transmit the bank address of bank 401 and a command type representative of a CAS operation to comparators 1201a–1206a of control history logger 913. Comparator 1202a will detect a match of the bank addresses. Comparator 1202a will also compare the command types and determine that the CAS operation cannot be performed within two clock cycles of a RAS operation within the same bank. In response, comparator 1202a will transmit a hold command (e.g., HOLDL) to transaction scheduler 912. The use of the command history logger helps to reduce the complexity of transaction scheduler 912 significantly.

Transaction scheduler 912 determines which memory operation submitted by servers 901–903 can be output to the multi-bank memory system 301. Transaction scheduler 912 is also responsible for terminating and starting each memory operation. Using the Hold and Retry signals, transaction scheduler 912 controls the advance of address sequencers (not shown) in each of servers 901–903. By taking the results of inter-server dependency checker 911, command history logger 914, and access priority decoder (not shown), transaction scheduler 912 selects a memory operation submitted by one of the servers 901–903 for output to multi-bank memory system 301. The priority decoder is necessary if two or more of servers 901–903 submit operations simultaneously, wherein the operations have no conflict with each other or with command history logger 913.

Although the invention has been described in connection with several embodiments, it is understood that this invention is not limited to the embodiments disclosed, but is capable of various modifications which would be apparent to one of ordinary skill in the art. Thus, the invention is limited only by the following claims.

What is claimed is:

1. A method for minimizing memory access time in a multi-processor or multi-process computer system with a memory subsystem comprising multiple memory banks with at least some of the memory banks containing corresponding sense amplifier cache lines, comprising:

reading a row of data values out of each of a first plurality of the memory banks;

storing each of the rows of data values into a sense amplifier cache line of the corresponding memory bank;

storing, in a cache tag memory bank, addresses of the memory banks storing a row of data values in a sense amplifier cache line;

storing, in the cache tag memory, row addresses of the rows of data values stored in the sense amplifier cache lines, there being a plurality of entries in the cache tag memory, each entry including a memory bank address and a memory row address, wherein the number of entries is less than the number of the sense amplifier cache lines in the computer system;

receiving an address corresponding to a data value stored in the memory banks and an access request from one of the processors or processes;

transmitting the address to the cache tag memory;

comparing the address to the bank addresses and row addresses stored in the cache tag memory;

generating a cache-hit signal if both of the bank address and row address of one of the entries of the cache tag memory matches said address;

generating a bank-miss signal if none of the bank addresses of the entries of the cache tag memory match said address; and generating a bank-conflict signal if in one of the entries of the cache tag memory the bank address matches while the cache line address does not match said address.

2. The method of claim 1, further comprising:

performing a column access operation in response to the cache-hit signal;

performing a row access operation followed by a column access operation in response to the bank-miss signal; and performing a precharge operation followed by a row access operation followed by a column access operation in response to the bank-conflict signal.

3. The method of claim 1, further comprising scheduling accesses to the memory banks.

4. The method of claim 1, further comprising generating a hold signal when more than one processor is requesting the same memory bank.

5. The method of claim 1, farther comprising predicting the memory bank and row addresses of a subsequent memory access.

6. The method of claim 1, wherein there is at least one entry in the cache tag memory for each process or processor in the computer system.

7. A multi-processor computer system, comprising:

a plurality of processors coupled to a memory subsystem, the memory subsystem comprising:

a plurality of memory banks, at least some containing corresponding sense amplifier cache lines;

a cache tag memory coupled to each of the memory banks and having a plurality of entries;

each entry including a memory bank address and memory row address, wherein the number of entries is less than the number of the cache lines; and a controller coupled to the cache tag memory and to the cache lines which reads data values out of a first plurality of the memory banks, stores the read data values into the sense amplifier cache line of the corresponding memory bank and stores in the cache tag memory bank the bank and row addresses of the stored rows of data values.

8. A method for operating a memory system in a computer system having a plurality of processors or processes coupled to a memory subsystem, the method comprising:

coupling a plurality of memory banks to the memory subsystem, wherein each of the memory banks has a dedicated sense amplifier circuit for storing data received from the corresponding memory bank;

maintaining the sense amplifier circuits of a first group of the memory banks in an active state to store cache data for the processors or processes, the first group including a predetermined first number of the memory banks; and maintaining a second group of the memory banks in a precharged state, the second group including a second number of the memory banks, wherein any one of the memory banks can be in either the first group or the second group.

* * * * *